Patented Jan. 23, 1934

1,944,539

UNITED STATES PATENT OFFICE 1,944,539

AZO DYESTUFFS AND FIBER DYED THEREWITH

Arthur Zitscher, Offenbach-on-the-Main, Heinrich Morschel, Cologne-Deutz, and Wilhelm Luce, Hofheim-on-the-Taunus, Germany, assignors to General Aniline Works, New York, N. Y., a corporation of Delaware No Drawing. Application May 4, 1932, Serial No. 609,266, and in Germany May 11, 1931

20 Claims. (Cl. 260—95)

The present invention relates to new azo dyestuffs and to fiber dyed therewith, more particularly it relates to azo dyestuffs of the general formula:

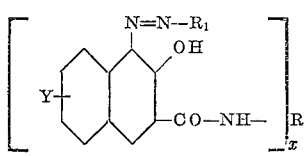

wherein $x$ means the number 1 or 2, Y stands for an alkoxy or alkylthio group, $R_1$ for a radical of the benzene, naphthalene, diphenyl or anthraquinone series, and R for a radical of the benzene, naphthalene or diphenyl series.

In the pertaining art azo dyestuffs have been described which are obtainable by combining a diazo compound with a 2.3-hydroxynaphthoic acid arylide substituted in the arylide radical by one or more alkoxy groups. However, dyestuffs made from 2.3-hydroxynaphthoic acid arylides substituted by such groups in the nucleus of the 2.3-hydroxynaphthoic acid radical are not known.

In view of the lack of knowledge of the behavior of 2.3-hydroxynaphthoic acid arylides substituted by alkoxy groups in the 2.3-hydroxynaphthoic acid radical, nothing can be foretold as to the effect which may be produced by such substituents on the properties of the dyestuffs formed from these arylides.

We have found that new azo dyestuffs are obtainable by coupling a suitable diazo-compound with an arylide of a 6-alkoxy-2.3-hydroxynaphthoic acid.

It is surprising that the shades of the dyestuffs obtainable by using a 6-alkoxy-2.3-hydroxynaphthoic acid arylide as the azo-component are situated considerably nearer to the blue of the spectrum than those of the dyestuffs obtained by means of the known corresponding 2.3-hydroxynaphthoic acid arylides which do not contain an alkoxy group in the 6-position of the naphthalene nucleus. Such an extension and variation of the color scale is of particular industrial advantage.

Furthermore, we have found that new azo dyestuffs are also made by coupling a suitable diazo-compound with an arylide of a 6-alkylthio-2.3-hydroxynaphthoic acid, or with an arylide of a 5-, 7- or 8-alkoxy-2.3-hydroxynaphthoic acid or of a 5-, 7- or 8-alkylthio-2.3-hydroxynaphthoic acid.

By using the 6-alkylthio-2.3-hydroxynaphthoic acid arylides, the shades of the dyestuffs obtained are likewise displaced to the blue side of the spectrum. In the case of the dyestuffs obtainable by using as azo components 2.3-hydroxynaphthoic acid arylides which contain an alkoxy- or alkylthio group in the 5-, 7- or 8-position of the naphthalene nucleus, the shades are not so much altered. The shades of the dyestuffs obtainable from 7-alkoxy-2.3-hydroxynaphthoic acid arylides are not at all, or only somewhat, displaced to the yellow side of the spectrum.

The dyestuffs can be made in the usual manner by producing them in substance or on the fiber or on any of the usual substrata adapted for the production of lakes.

If the dyestuffs are produced on the fiber, it is essential that the components, the diazo compound as well as the arylide compound, contain no substituents known to render azo dyestuffs made from 2.3-hydroxynaphthoic acid arylides soluble in water or alkalies and tending to depreciate the fastness of the dyeings to alkalies. Substituents of this kind are, for instance, the sulfonic acid and the carboxylic acid groups.

The following examples serve to illustrate the invention the parts being by weight, unless otherwise stated:

(1) 50 grams of cotton yarn are impregnated with a solution containing 6 grams of 6-methoxy-2-hydroxynaphthalene-3-carboxylic acid anilide,
12 cc. of sodium Turkey red oil of 50% strength,
40 cc. of 2N-caustic soda solution,
6 cc. of formaldehyde of 40% strength, per liter. The yarn is squeezed and the dyestuff is developed with a solution containing per liter the diazo compound from 1.42 grams of 4-chloro-2-amino-1-methyl-benzene and feebly acid with acetic acid. Thereupon, the material is rinsed and soaped in a boiling soap bath. There is thus obtained a bluish-garnet dyeing of good properties of fastness.

The dyestuff has the following formula:

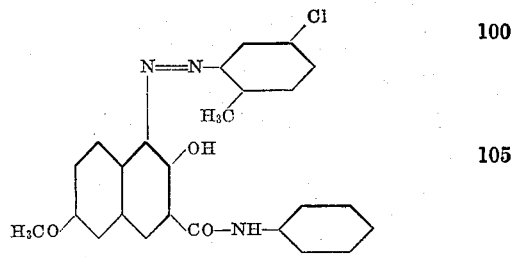

By using a diazo compound of 4-amino-1.3- dimethyl-benzene or of 4-chloro-2-nitraniline, there are likewise obtained garnet dyeings; by using a diazo compound of 2-nitraniline a brownish-bordeaux dyeing is produced.

By impregnating the yarn with 8-methoxy-2-hydroxynaphthalene-3-carboxylic acid anilide and developing the dyestuff with the above-mentioned diazo compound, a bluish-red dyeing is obtained, whereas from 7-methoxy-2-hydroxynaphthalene-3-carboxylic acid anilide and the same diazo-compound a yellowish-scarlet dyeing is produced. By using the diazo compound of ortho-nitraniline and 7-methoxy-2-hydroxynaphthalene-3-carboxylic acid anilide a brown-red dyeing is obtained.

(2) 6 grams of 6-methoxy-2-hydroxynaphthalene-3-carboxylic acid-4'-methyl-1'-anilide are mixed with
12 cc. of sodium Turkey red oil and
40 cc. of 2N-caustic soda solution; the whole is dissolved by addition of hot water,
12 cc. of caustic soda solution of 40° Bé. and
6 cc. of formaldehyde solution of 40% strength are added, and the whole is made up to
1000 cc.

50 grams of cotton yarn are impregnated with this solution, squeezed and developed by means of a solution containing, per liter, the diazo compound made from 3.2 grams of 2.5-dichloroaniline, and feebly acid with acetic acid. When the coupling is finished, the material is rinsed and soaped in a boiling soap bath. There is obtained a bright ruby-red dyeing.

The dyestuff has the following formula:

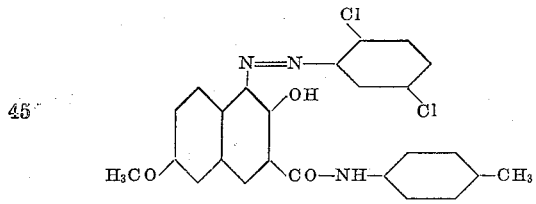

A bordeaux-red dyeing is obtained by impregnating the fiber with a solution of 6-methylthio-2-hydroxynaphthalene-3-carboxylic acid anilide or 6-methylthio-2-hydroxynaphthalene-3-carboxylic acid-ortho-toluidide and developing the dyestuff in the same manner with a diazo-solution of 2.5-dichloroaniline. By using the same diazo-compound and 7-methoxy-2-hydroxynaphthalene-3-carboxylic acid-4'-methyl-1'-anilide, a scarlet dyeing is obtained.

(3) Cotton yarn which has been prepared in a suitable manner is impregnated with a solution containing 2 grams of 6-methoxy-2-hydroxynaphthalene-3-carboxylic acid-2'-methoxy-1'-anilide,
4 cc. of sodium Turkey red oil of 50% strength, and
4 cc. of caustic soda solution of 34° Bé.

per liter and squeezed. Thereupon, the dyestuff is developed in a diazo-solution which has been neutralized by means of sodium bicarbonate and contains per liter the diazo compound of 3 grams of 1-amino-4-benzoylamino-2.5-diethoxybenzene, rinsed and soaped.

There is obtained a bluish-green dyeing of good properties of fastness.

The dyestuff has the following formula:

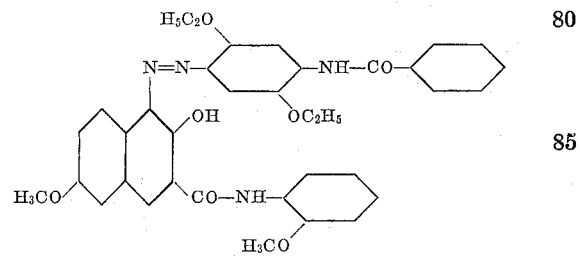

By using a diazo compound from 4-amino-4'-methoxy-diphenylamine and as the coupling component the β- or α-naphthylamide of 6-methoxy-2-hydroxynaphthalene-3-carboxylic acid or the anilide of 6-methylthio-2-hydroxynaphthalene-3-carboxylic acid, there are likewise obtained bluish-green dyeings. From 7-methoxy-2-hydroxynaphthalene-3-carboxylic acid-2'-methoxy-1'-anilide and diazotized 1-amino-4-benzoylamino-2.5-diethoxy-benzene, a bluish-violet dyeing is produced.

(4) 3 grams of 7-methylthio-2-hydroxynaphthalene-3-carboxylic acid-2'-methoxy-1'-anilide (melting at 164° C.) are dissolved in
12 cc. of alcohol,
1.5 cc. of water and
1.5 cc. of caustic soda solution of 38° Bé.

This solution is introduced into a solution of 5 cc. of Turkey red oil of 50% strength,
5 cc. of caustic soda solution of 38° Bé., and
975 cc. of water.

50 grams of cotton yarn are treated with this grounding liquor for half-an-hour; thereupon, the yarn is squeezed or hydroextracted and developed with a diazo-solution, feebly acid with acetic acid and prepared in the usual manner by diazotizing 2 grams of 4-chloro-2-amino-1-toluene hydrochloride, adding sodium acetate until the diazo-solution is neutral to Congo paper, then adding 25 grams of dissolved sodium chloride and making up the whole to 1 liter. When the development is completed, the material is well rinsed, soaped in a boiling soap bath and dried. A bright red dyeing of good fastness properties is thus obtained.

The dyestuff has the following formula:

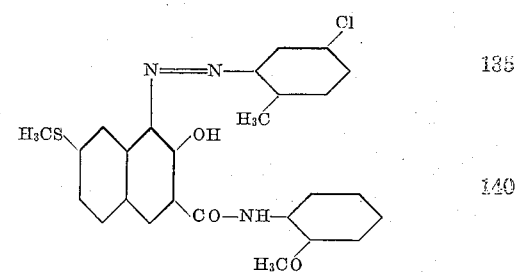

By developing in the same manner with a diazo-solution from meta-chloraniline, there is obtained a somewhat dull red dyeing, and by developing with a diazo-solution from 2.5-dichloraniline, there is obtained a brownish-red dyeing.

By impregnating the fiber in an analogous manner with 7-methylthio-2-hydroxynaphthalene-3-carboxylic acid-2'-methyl-4'-methoxy-1'-anilide (melting at 214° C.) and developing the dyestuff with diazotized 4-chloro-2-amino-1-toluene, there is obtained a yellowish-red dyeing; by developing with diazotized meta-chloraniline or diazotized 2.5-dichloraniline more yellowish-red dyeings are obtained.

(5) Cotton yarn which has been prepared in a suitable manner is impregnated with a solution containing 2 grams of 6-methylthio-2-hydroxynaphthalene-3-carboxylic acid anilide,
4 cc. of sodium Turkey red oil of 50% strength, and
4 cc. of caustic soda solution of 34° Bé.

per liter and squeezed. Thereupon, the dyestuff is developed in a diazo-solution, which has been neutralized by means of sodium bicarbonate and contains per liter the diazo-compound of 3 grams of 1-amino-4-benzoylamino-2.5-diethoxy-benzene, rinsed and soaped.

There is obtained a greenish-blue dyeing of good properties of fastness.

The dyestuff has the following formula:

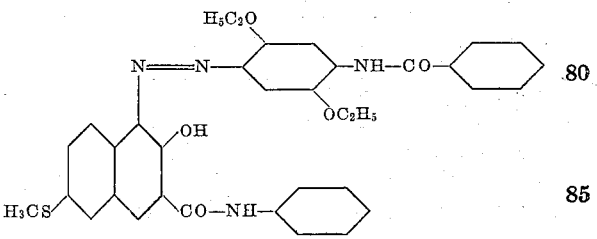

(6) 293 parts of 6-methoxy-2-hydroxynaphthalene-3-carboxylic acid anilide are made into a paste with 500 parts of acetone, which paste is dissolved by addition of 200 parts of caustic soda solution of 40° Bé. and 9000 parts of water. To this solution, there is run a diazo-solution which is prepared in the usual manner from 162 parts of 2.5-dichloraniline. The dyestuff obtained is filtered by suction and forms a bluish-red powder.

The following table indicates a number of dyestuffs obtainable according to the present invention, but it is not intended to limit the invention to the dyestuffs mentioned therein.

| | Diazotizing component | Coupling component | Shade |
|---|---|---|---|
| 1 | 1-amino-4-benzoylamino-2.5-dimethoxybenzene | 6-methylthio-2-hydroxynaphthalene-3-carboxylic acid-anilide | Blue |
| 2 | 4-amino-4'-methoxydiphenylamine | do | Greenish-blue |
| 3 | 1-amino-4-benzoylamino-2.5-diethoxybenzene | 6-methylthio-2-hydroxynaphthalene-3-carboxylic acid-2'-methyl-1'-anilide | Blue |
| 4 | 1-amino-4-benzoylamino-2.5-dimethoxybenzene | do | Do. |
| 5 | 4-amino-4'-methoxydiphenylamine | do | Do. |
| 6 | 1-amino-4-benzoylamino-2.5-diethoxybenzene | 6-methylthio-2-hydroxynaphthalene-3-carboxylic acid-2'-methoxy-1'-anilide | Do. |
| 7 | 1-amino-4-benzoylamino-2.5-dimethoxybenzene | do | Reddish-blue |
| 8 | 4-amino-4'-methoxydiphenylamine | do | Blue |
| 9 | o-chloraniline | 6-methoxy-2-hydroxynaphthalene-3-carboxylic acid-anilide | Bluish-red |
| 10 | 2.5-dichloraniline | do | Clear bluish-red |
| 11 | 2.3-dichloro-4-methyl-1-aminobenzene | do | Garnet |
| 12 | 2-chlor-5-methoxy-4-benzoylamino-1-amino-benzene | do | Dark currant-brown |
| 13 | 2-phenoxy-5-chloro-1-aminobenzene | do | Bluish-red |
| 14 | 4-chloro-2-nitro-1-aminobenzene | do | Garnet |
| 15 | 5-nitro-2-methyl-1-aminobenzene | do | Bluish-red |
| 16 | 4-methyl-2-nitro-1-aminobenzene | do | Yellowish-garnet |
| 17 | 2'3-dimethyl-4-amino-azobenzene | do | Blackish-currant |
| 18 | 5-chloro-2-methoxy-4-benzoylamino-1-amino-benzene | do | Dark violet-blue |
| 19 | 4'-methoxy-4-aminodiphenylamine | do | Dark blue |
| 20 | 4'-nitro-2.5-dimethoxy-4-aminoazobenzene | do | Black |
| 21 | 2-methyl-5-methoxy-4-amino-4' (-p-aminophenylamino)-azobenzene | do | Greenish-black |
| 22 | 2.5-dichloraniline | 6-ethoxy-2-hydroxynaphthalene-3-carboxylic acid-anilide | Bluish-red |
| 23 | Do | 6-isopropyloxy-2-hydroxynaphthalene-3-carboxylic acid-anilide | Do. |
| 24 | Do | 6-n-butyloxy-2-hydroxynaphthalene-3-carboxylic acid-anilide | Do. |
| 25 | Do | 6-isoamyloxy-2-hydroxynaphthalene-3-carboxylic acid-anilide | Do. |
| 26 | Do | 6-sec.-octyloxy-2-hydroxynaphthalene-3-carboxylic acid-anilide | Do. |
| 27 | 4'-methoxy-4-aminodiphenyl-amine | 6-ethoxy-2-hydroxynaphthalene-3-carboxylic acid-anilide | Blue |
| 28 | Do | 6-isopropyloxy-2-hydroxynaphthalene-3-carboxylic acid-anilide | Do. |
| 29 | Do | 6-n-butyloxy-2-hydroxynaphthalene-3-carboxylic acid-anilide | Do. |
| 30 | Do | 6-isoamyloxy-2-hydroxynaphthalene-3-carboxylic acid-anilide | Do. |
| 31 | Do | 6-sec.-octyloxy-2-hydroxynaphthalene-3-carboxylic acid-anilide | Do. |
| 32 | m-chloraniline | 6-methoxy-2-hydroxynaphthalene-3-carboxylic acid-2'5'-dimethoxy-1'-anilide | Bordeaux |
| 33 | 4-chloro-2-methyl-1-aminobenzene | do | Do. |
| 34 | 2.5-dichloraniline | do | Do. |
| 35 | 2-methyl-3-chloro-1-aminobenzene | do | Do. |
| 36 | m-xylidine | do | Ruby-red |
| 37 | 4-nitraniline | do | Garnet |
| 38 | α-aminoanthraquinone | do | Do. |
| 39 | 2-nitraniline | do | Do. |
| 40 | 2-methyl-4-nitro-1-aminobenzene | do | Bluish-garnet |
| 41 | 4-methyl-2-nitro-1-aminobenzene | do | Currant |
| 42 | 4-chloro-2-nitro-1-aminobenzene | do | Do. |
| 43 | 2-methoxy-4-nitro-1-aminobenzene | do | Bluish-currant |
| 44 | 4-methoxy-2-nitro-1-aminobenzene | do | Black-violet |
| 45 | 2.5-dimethoxy-4-benzoylamino-1-aminobenzene | do | Reddish-blue |
| 46 | 4'-methoxy-4-aminodiphenylamine | do | Covered navy blue |
| 47 | 4'-nitro-2.5-dimethoxy-4-aminoazobenzene | do | Bluish-black |
| 48 | 2.5-dichloraniline | 6-methoxy-2-hydroxynaphthalene-3-carboxylic acid-2'5'-dimethyl-1'-anilide | Ruby-red |
| 49 | 5-chloro-2-methyl-1-aminobenzene | do | Vivid bordeaux |
| 50 | o-chloraniline | do | Red |

| | Diazotizing component | Coupling component | Shade |
|---|---|---|---|
| 51 | o-nitraniline | 6-methoxy-2-hydroxynaphthalene-3-carboxylic acid 2′5′-dimethyl-1′-anilide | Bordeaux-garnet |
| 52 | α-aminoanthraquinone | do | Garnet |
| 53 | 4-chloro-2-nitro-1-aminobenzene | do | Currant |
| 54 | 2-methyl-4-nitro-1-aminobenzene | do | Do. |
| 55 | 4-nitraniline | do | Do. |
| 56 | 4-methoxy-2-nitraniline | do | Violet-black |
| 57 | 2-methoxy-4-nitraniline | do | Black-violet |
| 58 | 2.4′-dimethyl-2′-nitro-5-methoxy-aminoazobenzene | do | Very deep violet-brown. |
| 59 | 4′-methoxy-4-amino-diphenylamine | do | Greenish-navy blue |
| 60 | 2.5-dimethoxy-4-benzoylamino-1-aminobenzene | do | Reddish-blue |
| 61 | o-dianisidine | do | Greenish-navy blue |
| 62 | o-phenitidine-azo-α-naphthylamine | do | Greenish-black |
| 63 | 4.4′-diaminodiphenylamine | do | Black-blue |
| 64 | 2-methoxy-4-amino-4′-dimethylaminoazobenzene | 6-methoxy-2-hydroxynaphthalene-3-carboxylic acid-4′-methoxy-1′-naphthylamide | Greenish-black |
| 65 | 3-methoxy-4-amino-4′-dimethylaminoazobenzene | do | Do. |
| 66 | 3-methoxy-4-aminodiphenylamine | 6-methoxy-2-hydroxy naphthalene-3-carboxylic acid-α-naphthylamide | Do. |
| 67 | Do | 6-methoxy-2-hydroxy-naphthalene-3-carboxylic acid-β-naphthylamide | Do. |
| 68 | p-nitraniline | 6-methoxy-2-hydroxynaphthalene-3-carboxylic acid-2′-chloro-1′-anilide | Bordeaux-currant |
| 69 | Do | 6-methoxy-2-hydroxynaphthalene-3-carboxylic acid-3′-chloro-1′-anilide | Brownish-red |
| 70 | Do | 6-methoxy-2-hydroxynaphthalene-3-carboxylic acid-4′-chloro-1′-anilide | Currant |
| 71 | o-chloraniline | 6-methoxy-2-hydroxynaphthalene-3-carboxylic acid-4′-nitro-1′-anilide | Bluish-red |
| 72 | 2.5-diethoxy-4-benzoylamino-1-aminobenzene | 6-methoxy-2-hydroxynaphthalene-3-carboxylic acid-3′-nitro-1-anilide | Navy blue |
| 73 | 2-methoxy-4-nitroaniline | 6-methoxy-2-hydroxynaphthalene-3-carboxylic acid-3′-nitro-4′-ethoxy-1′-anilide | Violet |
| 74 | o-dianisidine | 6-methoxy-2-hydroxynaphthalene-3-carboxylic acid-4′-phenylamino-1′-anilide | Navy blue |
| 75 | 2-methoxy-4-nitroaniline | 6-methoxy-2-hydroxynaphthalene-3-carboxylic acid-4′-phenyl-1′-anilide | Violet |
| 76 | α-naphthylamine | 6-methoxy-2-hydroxynaphthalene-3-carboxylic acid-β-naphthylamide | Black-violet |
| 77 | α-aminoanthraquinone | di-(6-methoxy-2-hydroxynaphthalene-3-carboxylic acid-)dianisidide. | Garnet |
| 78 | 2.5-diethoxy-4-benzoyl-amino-1-aminobenzene | do | Black-violet |
| 79 | 4′-methoxy-4-aminodiphenylamine | do | Bluish-black |
| 80 | as.-m-xylidine | do | Garnet |
| 81 | 2-methoxy-1-amino-5-sulfonic acid-diethylamide | do | Dark bordeaux |
| 82 | 2.4′-dimethyl-2′-nitro-5-methoxy-4-amino-azobenzene | do | Dark brown |
| 83 | 4′-nitro-2.5-dimethoxy-4-aminoazobenzene | do | Black-brown |
| 84 | 4-chloro-2-methyl-1-aminobenzene | di-(6-methoxy-2-hydroxy-naphthalene-3-carboxylic acid-)p-phenylenediamine | Garnet |
| 85 | 2-methoxy-4-nitro-1-aminobenzene | do | Currant |
| 86 | 4′-nitro-2.5-dimethoxy-4-aminoazobenzene | do | Black |
| 87 | 4-nitraniline | do | Reddish-brown |
| 88 | 4-methyl-2-nitro-1-aminobenzene | di-(6-methoxy-2-hydroxy-naphthalene-3-carboxylic acid-)m-phenylenediamine | Garnet |
| 89 | 2-methoxy-5-nitro-1-aminobenzene | do | Bordeaux |
| 90 | 2-chloro-1-aminobenzene | do | Very bluish-red |
| 91 | 4′-methoxy-4-amino-diphenylamine | do | Greenish-navy blue |
| 92 | 2.4′-dimethyl-2′-nitro-5-methoxy-4-aminoazobenzene | do | Bluish-black |
| 93 | 4-nitro-1-aminobenzene | do | Garnet |
| 94 | 4-chloro-2-methyl-1-aminobenzene | di-(6-methoxy-2-hydroxy-naphthalene 3-carboxylic acid-)4.4′-diaminodiphenylether | Bordeaux |
| 95 | 2-methoxy-4-nitro-1-aminobenzene | do | Garnet |
| 96 | α-aminoanthraquinone | do | Bordeaux |
| 97 | 2.5-dichloraniline | do | Do. |
| 98 | 2′3-dimethyl-4-aminoazobenzene | do | Currant |

We claim:

1. The azo dyestuffs of the following general formula:

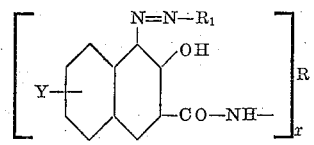

wherein $x$ means the number 1 or 2, Y stands for an alkoxy or alkylthio group, $R_1$ for a radical of the benzene, naphthalene, diphenyl or anthraquinone series, and R for a radical of the benzene, naphthalene or diphenyl series, yielding, when produced on the fiber, dyeings of various shades.

2. The azo dyestuffs of the following general formula:

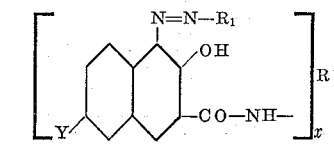

wherein $x$ means the number 1 or 2, Y stands for an alkoxy or alkylthio group, $R_1$ for a radical of the benzene, naphthalene, diphenyl or anthraquinone series, and R for a radical of the benzene, naphthalene or diphenyl series, yielding, when produced on the fiber, dyeings of various shades.

3. The azo dyestuffs of the following general formula:

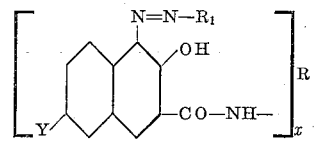

wherein $x$ means the number 1 or 2, Y stands for an alkoxy group, $R_1$ for a radical of the benzene, naphthalene, diphenyl or anthraquinone series, and R for a radical of the benzene, naphthalene or diphenyl series, yielding, when produced on the fiber, dyeings of various shades.

4. The azo dyestuffs of the following general formula:

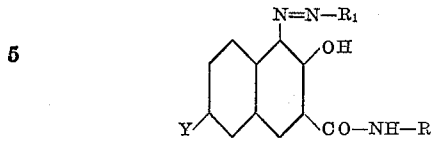

wherein Y stands for an alkoxy group, $R_1$ for a radical of the benzene, naphthalene, diphenyl or anthraquinone series, and R for a radical of the benzene, naphthalene or diphenyl series, yielding, when produced on the fiber, dyeings of various shades.

5. The azo dyestuffs of the following general formula:

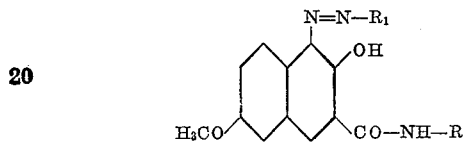

wherein $R_1$ stands for a radical of the benzene, naphthalene, diphenyl or anthraquinone series, and R for a radical of the benzene, naphthalene or diphenyl series, yielding, when produced on the fiber, dyeings of various shades.

6. The azo dyestuffs of the following general formula:

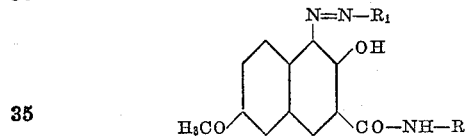

wherein $R_1$ stands for a radical of the benzene series, and R for a radical of the benzene, naphthalene or diphenyl series, yielding, when produced on the fiber, dyeings of various shades.

7. The azo dyestuffs of the following general formula:

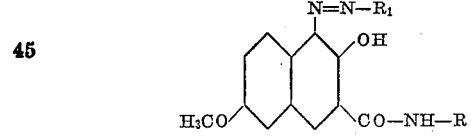

wherein R and $R_1$ stand for radicals of the benzene series, yielding when produced on the fiber, dyeings of various shades.

8. Fiber dyed with the azo dyestuffs as claimed in claim 1.

9. Fiber dyed with the azo dyestuffs as claimed in claim 2.

10. Fiber dyed with the azo dyestuffs as claimed in claim 3.

11. Fiber dyed with the azo dyestuffs as claimed in claim 4.

12. Fiber dyed with the azo dyestuffs as claimed in claim 5.

13. Fiber dyed with the azo dyestuffs as claimed in claim 6.

14. Fiber dyed with the azo dyestuffs as claimed in claim 7.

15. The azo dyestuff of the following formula:

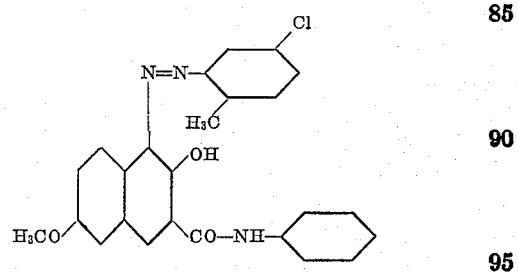

yielding, when produced on the fiber, a bluish-garnet dyeing.

16. The azo dyestuff of the following formula:

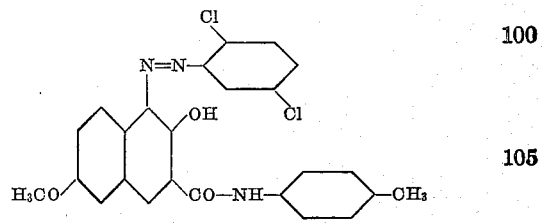

yielding, when produced on the fiber, a bright ruby-red dyeing.

17. The azo dyestuff of the following formula:

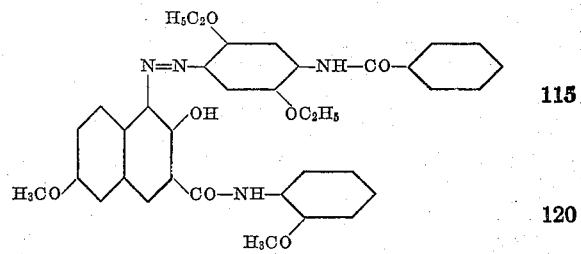

yielding, when produced on the fiber, a bluish-green dyeing.

18. Fiber dyed with the azo-dyestuff as claimed in claim 15.

19. Fiber dyed with the azo dyestuff as claimed in claim 16.

20. Fiber dyed with the azo dyestuff as claimed in claim 17.

ARTHUR ZITSCHER.
HEINRICH MORSCHEL.
WILHELM LUCE.